(12) United States Patent
Connors

(10) Patent No.: US 8,132,778 B2
(45) Date of Patent: Mar. 13, 2012

(54) REMOTE CONTROL WATER VALVING SYSTEM FOR SHOWER OR SINK

(76) Inventor: Paul E. Connors, Henderson, NV (US)

( * ) Notice: Subject to any disclaimer, the term of this patent is extended or adjusted under 35 U.S.C. 154(b) by 0 days.

(21) Appl. No.: 12/398,731

(22) Filed: Mar. 5, 2009

(65) Prior Publication Data

US 2009/0261282 A1    Oct. 22, 2009

Related U.S. Application Data

(60) Provisional application No. 61/047,085, filed on Apr. 22, 2008.

(51) Int. Cl.
*F16K 31/02* (2006.01)
(52) U.S. Cl. .............. 251/129.04; 4/605; 4/623
(58) Field of Classification Search .......... 251/129.01, 251/129.04; 4/597, 605, 623
See application file for complete search history.

(56) References Cited

U.S. PATENT DOCUMENTS

| | | | | |
|---|---|---|---|---|
| 5,813,655 A * | 9/1998 | Pinchott et al. | .......... | 251/129.04 |
| 5,881,755 A * | 3/1999 | Dieringer | .......... | 137/1 |
| 6,250,601 B1 * | 6/2001 | Kolar et al. | .......... | 251/129.04 |
| 6,317,717 B1 * | 11/2001 | Lindsey et al. | .......... | 704/275 |
| 6,337,635 B1 * | 1/2002 | Ericksen et al. | .......... | 340/825.69 |
| 6,491,062 B1 * | 12/2002 | Croft | .......... | 137/624.11 |

\* cited by examiner

*Primary Examiner* — John K Fristoe, Jr
(74) *Attorney, Agent, or Firm* — Donn K. Harms

(57) ABSTRACT

A remote controlled valve for cessation of water flow from an outflow component such as a showerhead or faucet during periods where water flow is not required by the user to provide for water conservation. The device features a remote control having a large contact area for contact with the user's arm or leg or hip to allow for activation without the use of their hands and fingers. The large size also renders the remote control unit easily located by sense of touch and without the user's eyesight to encourage use by users who might otherwise be concerned about reinitiating water flow during shampooing or while using the device on a sink with their hands wet or occupied.

8 Claims, 2 Drawing Sheets

REMOTE CONTROL WATER VALVING SYSTEM FOR SHOWER OR SINK

This application claims priority to U.S. Provisional Patent Application No. 61/047,085 filed Apr. 22, 2008 and which is incorporated herein in its entirety by reference.

FIELD OF THE INVENTION

The disclosed invention relates to water flow control. More particularly it relates to a system and method providing for a user operated remote control which may be activated by contact with any part of the body, to temporarily cease the flow of water already running in a shower or sink.

BACKGROUND OF THE INVENTION

Water for domestic use is becoming ever-harder to provide with an expanding population. Over many years dams providing reservoirs and increased drilling for ground water have managed to provide water to an ever growing population in the United States and the industrialized world. Consequently, while shortages occur due to drought and other supply interruption, such shortages have not been too severe.

In coming years however, and currently in dry venues such as Southern California, the supply is already insufficient to meet the growing population of people and the new homes constructed for that increased population. This shortage will only become more acute since building dams and reservoirs has virtually ceased due to environmental concerns. Further exacerbating the shortages is the ongoing drought in the Western States which appears to be cyclical and will as such return again once the current drought abates.

In spite of such shortages, new housing continues to be built for the expanding population. Many homes and businesses such as hotels, are equipped with showers and sinks for use in bathing and hygiene. More showers, sinks, and such, will continue to put additional perpetual strain on the finite water supply available.

Additionally, 14 to 25% of the electric bills are directed to the energy required for water heater heating, and reheating in homes. It takes an average of 20 minutes of energy use from heating or gas to initially raise the temperature of the water in the heater to 140 degrees. Consequently, reducing water usage not only saves the water itself, but also conserves valuable energy resources and resulting energy costs.

Further, statistics show the average person living alone will use approximately 94,000 gallons of water in his home each year. Most of this water is used on showers and in sinks where water constantly runs during use. It is estimated that the employment of the device herein, will save ⅔ of the water previously used, or 62,000 gallons, per person. Multiplying this savings by the millions of people in the United States indicates the potential for a staggering amount of water conservation and concurrent energy conservation with a reduction in the use of energy needed to heat the water contained within hot water heaters.

During normal water usage by individuals there are times when the water is uselessly running down the drain. Such instances occur because by default, once valves for water flow are turned on, water will flow until the valves are closed. This is by design in that persons using a shower in the past, wanted the water to run continuously while bathing.

To that end, for instance during a shower, people will soap up or put shampoo in their hair, and concurrently, step out of the stream of water, which is always on by default, to avoid the flow. Once soap has been spread or shampoo massaged through the hair, most users then step back into the water stream for a short rinse period. With many users, the time out of the stream of water in a shower, will actually be longer than their time within the stream of water.

The same problem of water and energy waste arises with facial washing or tooth brushing at a sink, or while hand-washing dishes. Since water is initially turned on by opening the valves to the spigot or faucet, during the period of time of facial scrubbing, or actual tooth brushing, valuable water continues to run down the drain. With dishes, when rinsing, water from the tap continues to run even when the user is not rinsing. As such, a device which allows for selective cessation of flow by the user, without touching the water spigots, would save large amounts of water and in the case of hot water, would save energy too.

As a consequence of water running from showers and faucets continually by default, a device which allows for the user to cease this water flow, during periods in which they would normally avoid the stream of running water, would eliminate the need to step out, and, save a large portion of the hot and cold water that currently runs right down the drain.

Accordingly, there is an unmet need for a method and apparatus which may be easily employed to minimize water usage in new and old homes to conserve the finite supply so that more people may be serviced. Such a device should be easily engageable to the installed base of showers, faucets and the like. Such a device should be easily employable by users, once water is running, to encourage usage. Such a device, should be easily included in new construction, and should be easy to retrofit into old construction, to thereby save water in the maximum number of homes and businesses.

It is thus an object of the invention to provide a device and method for water conservation in homes and businesses.

It is a further object to provide such a device and method that provides for easy remote control for periods of cessation of water flow from a faucet or shower head.

Further, such a device should be easily operated by the user using their hand, elbow, hip, or foot, depending on installation to thereby encourage actual use once installed.

These together with other objects and advantages which will become subsequently apparent reside in the details of the water conservation device and method of employment herein, as more fully hereinafter described and claimed, reference being had to the accompanying drawings forming a part thereof, wherein like numerals refer to like parts throughout.

With respect to the above, before explaining at least one preferred embodiment of the invention in detail, it is to be understood that the invention is not limited in its application to the details of construction and to the arrangement of the components or steps set forth in the following description or illustrated in the drawings. The various apparatus and methods of the invention are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing other user employable systems for temporary cessation of flowing water in a shower or sink, and the like, and for carrying out the several purposes of the present disclosed device. It is important, therefore, that the objects and claims be regarded as including such equivalent construction and methodology insofar as they do not depart from the spirit and scope of the present invention.

SUMMARY OF THE INVENTION

The disclosed system provides a novel and easily engageable set of components for the temporary cessation of already flowing water in an outflow component such as a shower head in a shower or a faucet in a sink. Allowing users to easily initiate a cessation of flowing water, with a simple touch of an area of their body to a controller, encourages use since they need not see it or have to employ a hand or finger. Thus, elimination of water and energy waste is encouraged during periods the user is occupied in a non-water task such as lathering, shampooing, or brushing their teeth, since the user need not employ the dexterity of a hand or finger to cease water flow. This is an important consideration when the eyes may not be opened such as when shampooing.

The device features a remote control component which is water resistant and provides a large, user-activated button on a switch component to activate a signal from the remote location, to temporarily cease water flow. The remote control component is adapted preferably with a very large contact area for activation which is easily depressed by a hand, foot, elbow, hip, or other body part of the user. Thus, the user need not see it, to initiate a cessation of water flow, or reinitiate water flow. The remote switching component can be battery powered, sonic, or have an internal pump engaged to a flexible conduit and activate the flow controller valve with fluid or air pressure developed during button depression.

In use, a power supply communicates with a controller which acts to communicate power to an electrically activated valve during periods of activation initiated by depression of the button of the remote control. The valve will move between an open position allowing water flow and a closed position ceasing water flow. The controller may require continuous pressure by a body part, somewhat like a deadman's switch, or the controller may have a flip-flop type switching circuits that alternatively energizes and de-energizes the communication of power to the valve controlling water flow. The device would thus cease the flow of already running water, and immediately restart the flow using a simple activation of the remote control component mounted on a wall or in the case of a sink, a cabinet.

In use, the user while lathering or shampooing when the user cannot easily see, or while brushing their teeth or lathering their face at a sink, an easy cessation of water flow is provided by a simple contact with a contact surface of the remote control component. This contact by a body part, will cause an RF, sonic, hydraulic, pneumatic, or optical signal, to be communicated to a controller which will act to energize the water valve to cease flow or in the case of an electronic signal, the water valve itself may be the control if it is already wired to move to the opposite position when signaled electronically.

Energizing the flow valve, through which water flows, to a closed position, employs wires energized by the closing of an actuator such as a solenoid which is activated by the remote control component. The remote control component as noted in an electronic version, may be a hardwired, or a radio or light transmission device, which transmits a signal to a receiver, which causes the valve to close or open directly or using a switching means such as a solenoid. Or it might have a pump that would generate a pneumatic signal through a conduit connected between the pump in the control and a pneumatic receiver engaged to actuate the electric control valve between the open an closed positions. To restart water, the button on the control is simply released if permanent pressure is required, or pressed again and released in the case of a flip-flop type of circuit activation.

Consequently, the user can easily, without the aide of eyesight, and with some body part, activate the remote control component to cause a cessation of the water flow when they are occupied in a fashion where water is not needed. A second contact with the contact area on the control would restart water flow. This would occur for instance in the case of lathering or shampooing in the shower. Water and energy are thus saved for this duration. The user need not be able to see the remote control component to activate it to turn the water off and on, thereby encouraging use.

DETAILED DESCRIPTION OF THE PREFERRED EMBODIMENT

Figure 4:
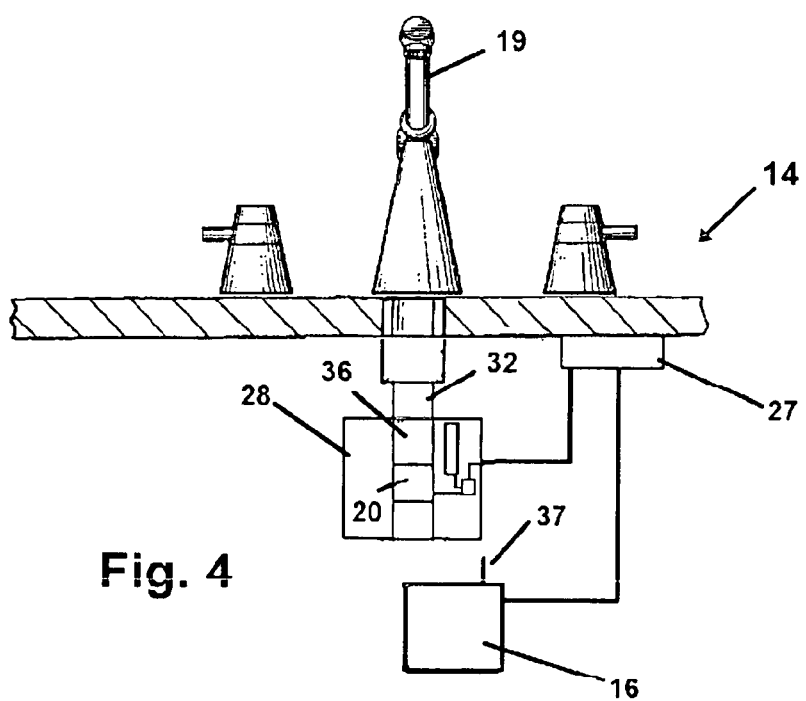
FIG. 4 shows a typical installation of the device herein on a faucet in bathroom or kitchen sink to initiate temporary flow cessation of the water therefrom.

Referring now to the drawings, FIGS. 1-4 where similar components are identified in one or more of the drawings with the same numerals, the disclosed device 10 provides a novel system for the temporary cessation of already-flowing water in an outflow component such as a shower head 18 in a shower 12 or a faucet 19 in a sink 14 (FIG. 4). During activation of the device 10 a user, need not employ any special dexterity or even their eyesight since the device 10 employs a control component 16 adapted with a contact area of sufficient size to provide a means for tactile location without eyesight. Currently a size from two square inches in size to thirty six square inches in size have proven to work well to allow the user to "find" the contact surface on the control component 16 without the aid of their eyesight. A six inch by six inch tile would work especially well on shower installations having this size tile as it would blend into the wall if positioned correctly, and provide the large area necessary to provide a contact surface locatable without eyesight. This means for tactile locating of the control component 16 thus encourages use for the control of water flow in a shower during periods where the user might be visually impaired, thereby eliminating wasted water and energy from running in periods when the user is occupied in a non-water task such as shampooing, lathering or in the case of a sink, brushing their teeth. The device 10 employed with a sink would encourage use since the user need not see the control component 16 or touch it with already occupied hands which might be washing their face or brushing their teeth. The size and location of the control component 16 make it easy to locate with the side of the leg or arm or even an elbow.

The device 10 using an electronic signal from the remote control component 16 would feature such which is substantially water proof and provides for a large, user activated contact area which may be found with the tactile sense, without the aid of eyesight. As noted a size between 1 inches in height and width and 6 inches in height and width (2 sq. in. to 36 sq. in.) have worked well in experimentation but those skilled in the art will realize that other sizes might be employed as long as the contact surface of the control component 16 is easily located by a sense of touch and without the aid of eyesight.

A touch of the contact surface on the control component will cause it, in all modes, to transmit a signal from the control component 16 to cease water flow from the shower head 18 or faucet 19 as shown in FIG. 4. The control component 16 is adapted preferably with this large contact area or which is sensitive to a touch, such as a capacitance type switch, or uses an actuated button for the contact surface which is easily depressed by a hand, foot, elbow, hip, or other body part of the user to allow locating without eyesight.

A number of modes of signal transmission from the control component 16 to actuate the water flow valve 20 between the open and closed position may be employed. The control component 16 can be battery powered to produce an electrical, sonic, or light, or pneumatic signal which is communicated to a means to switchably energize the flow valve 20 to move to the opposite position from one of closed and open. The battery powered mode is most preferred due to the water environment, and, it allows the control component 16 to simply be adhered to the tile or wall of the shower.

If the signal is electrical, contact with the contact surface of the control component 16 by a body part, will initiate the communication of a signal through wires 22, or by light transmission from a light emitter 23, or sonic transmission from a sonic signal generator, or by activation of an electric pump located on the control component 16. Or it will initiate an RF signal from a transmitter 37, and no wires 22 or other direct contact with the controller 28 to cease and restart water flow will be required. The RF or light transmission mode of signaling lends itself to easy installation of a wireless battery powered control component 16 and are therefore preferred for ease of installation, and safety.

If pneumatic, the signal would be generated with an electrical pump or pump powered by a depression of the contact surface of the control component 16. The pump in the control component 16, would be engaged to a flexible conduit 24 and hydraulically activate the controller with air pressure developed during a contact with the control surface or depression thereof. Since the device 10 operates in a water environment, if electrical power is employed, it is preferred to be from batteries 25, or optionally a low voltage power supply 27 or other low voltage sources. However, the power supply 27 would not be necessary if the batteries 25 are self contained in both the control component 16 and the controller 28.

Figure 1:
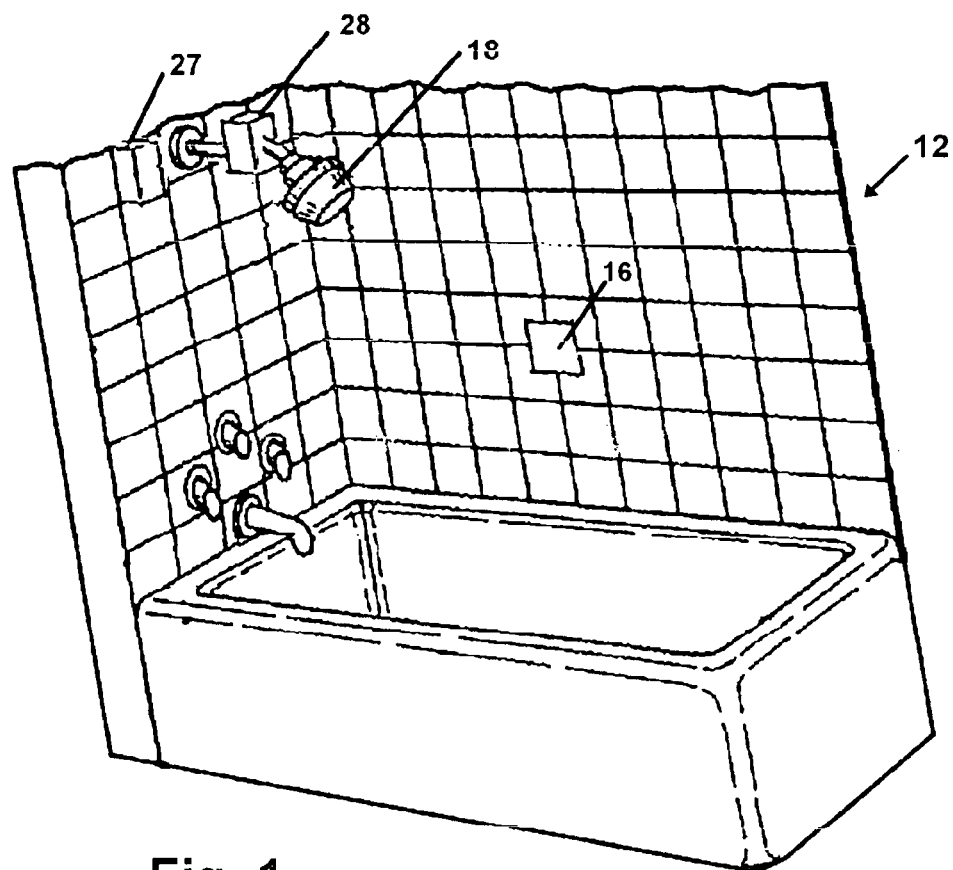
FIG. 1 is a perspective view of the device showing a typical installation with a wireless control button for at-will water flow cessation in a conventional outflow component such as a showerhead.
Figure 2:
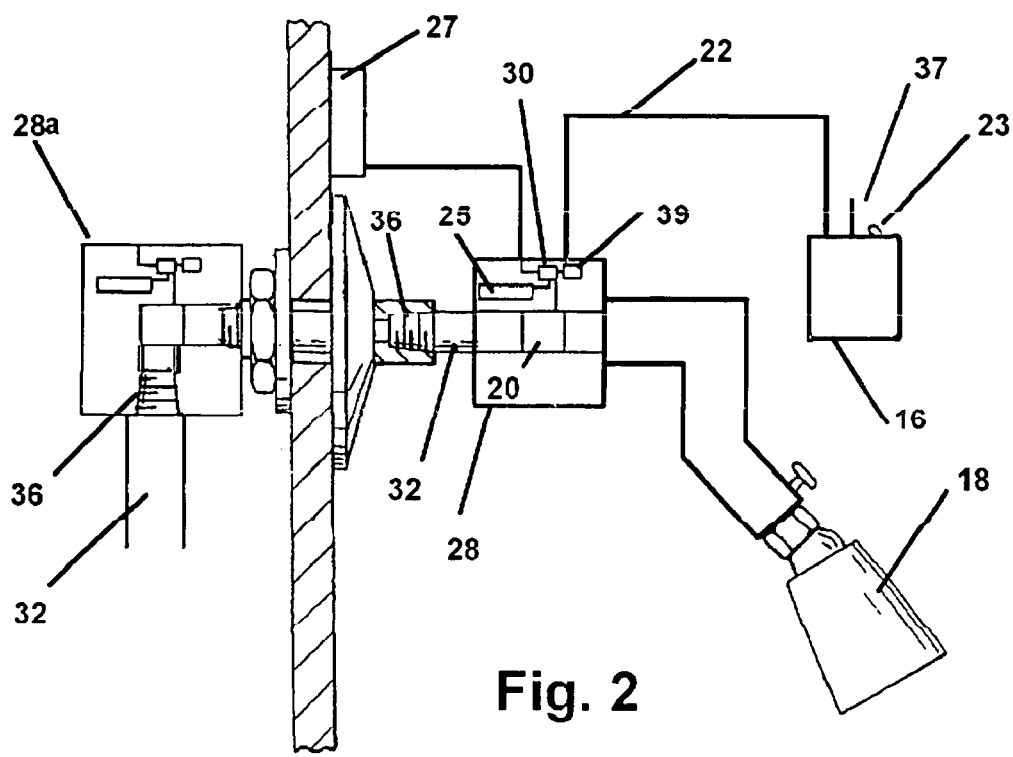
FIG. 2 is a diagram of a mode of the device employing electronic switching for cessation of water flow.
Figure 3:
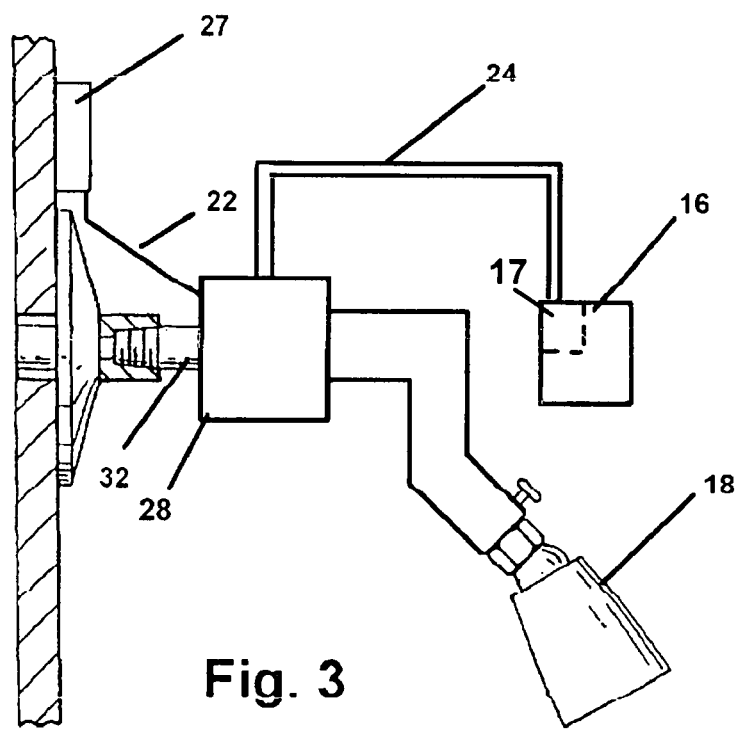
FIG. 3 depicts a pneumatic mode of the device of FIG. 1.

In use, electrical power from batteries 25 or a power supply 27 communicates with a controller 28, which may be part of the electronic valve itself or part of the control unit as shown in FIGS. 1,2, and 4, or may be part of or separate from the power supply 27 which acts to communicate power to wires 22 during periods of activation initiated by a body contact with the remote control component 16. Those skilled in the art will realize there are many ways to actuate the valve between the open and closed positions upon receipt of a signal from the control unit 16 and such is anticipate within the scope of this application.

Cessation of water flow by the user can require continuous pressure by a body part, somewhat like a deadman's switch, or preferably the control component 16 or the valve itself, may have a flip-flop type switching circuit communicating with it that alternatively energizes and de-energizes the wires 22 communicating power to a switch or solenoid 30 with each body contact or release of contact with the control component 16. Or the electric valve might simply be configured to switch between the open and closed position upon receipt of the signal. Of course the control component 16 may have a contact surface which is a simple depressed switch, or some type of conventional electronic contact sensor for the contact surface such as a capacitance sensor, which discerns a contact with the body of a user and initiates the signal.

Once energized by body contact with the control component 16, the wires 22 energize or send a signal to the flow valve 20 itself if configured in a manner to actuate, or to an electronic switch or an actuator such as the solenoid 30 to energize or move the flow valve 20 to close and interrupt already flowing water in the pipe 32 supplying the shower head 18 or faucet 19. The control unit 16 can then be contacted again by the user's body, to de-energize or otherwise switch the flow valve 20 to move to the open position to again permit water flow through the pipe 32.

While shown in the drawings with the battery 25 and switch or solenoid 20 in the control unit 28, those skilled in the art will realize that other modes of wiring and operation may be employed to cause the electrically actuate the flow valve 20 to turn the water on and off, based on a signal communicated by contact of the user's body with the control component 16. All such modes of wiring and operation are considered within the scope of this invention since a main object of the invention is placing a control component 16 of a size and in a position that makes it discoverable without eyesight and therefore encourages use by those with occupied hands, or with impaired eyesight while shampooing without having to worry about finding the control component 16.

For ease of use, the control unit 28 would engage using threaded engagements 36 to allow for easy installation on existing plumbing fixtures. Or, as shown in FIG. 1, optionally the control unit 28a may be installed in new construction in the wall leading to the pipe 32 supplying the plumbing fixture to be switched. Or, the flow valve 20 if adapted with circuitry to cause it to vacillate between open and closed positions upon receipt of the signal, might be employed by itself.

Employed in a sink installation as in FIG. 4, rather than a shower, the control component 16 would be mounted on a cabinet or wall near the sink such that the user may contact it with a leg or hip to initiate the signal to the valve 28 to either cease or restart water flow through the pipe 32. This would encourage use by individuals who might be fearful they could not use their hands for the control when they are wet or occupied.

As an example of use, the user while lathering or shampooing in a shower 12 or while brushing their teeth or lathering their face at a sink 14, would simply contact the control component 16, to cause the signal such as an electrical, RF, sonic, pneumatic, hydraulic, or optical signal, to be communicated to an actuator or controller or to the control valve itself, to energize the control valve 20 to temporarily close and cease water flow from the pipe 32. To restart water, the control component 16 would be contacted again by the user in a flip-flop type circuit, or in a circuit requiring continuous contact, the user would simply remove their body from contact with the control component 16.

Because of the ease of installation provided, the low voltage and lack of wiring using an RF or a light signal from the control component 16, to cause a switching of the flow valve 20, is especially preferred. This would allow the device 10 to be installed simply by adhering the control component to a wall surface such as tile shown in FIG. 1, and engaging the control unit 28 by threading it upon the pipe 32 supplying the plumbing fixture. If batteries 25 power both the control unit 28 and the control component 16, no wiring is necessary whatsoever, and the device 10 will install in minutes in virtually any shower 12 or sink 14 having pipes 32 adapted to engage the control unit 28 between the pipe 32 and the outflow component such as a shower head 18 or faucet 19. The battery powered mode of the device 10 would work especially well with a low power RF signal from transmitter 37, or light signal from the light emitter 23, such as an IR emitting LED, which would be received by optical or RF receiver 39, to initiate a closure or opening of the flow valve 20.

As noted, the depiction of the means to energize the flow valve 20 to open and close, in the drawings, is for illustrative purposes only, as those skilled in the art will realize other switching means are possible using the signal from the remote control component 16 to open and close the flow valve 20 when the user contacts the control component 16. The large surface area of the control component 16 is preferred so that users need not see it to initiate the device to cease or restart water flow.

While all of the fundamental characteristics and features of the improved disclosed remote control water flow system, for temporary cessation of sink or shower water flow, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A water flow control apparatus comprising:
    an electric valve, said electric valve engageable between a pressurized water supply and an outflow component from a group of outflow components including a showerhead and faucet;
    means to electrically power said electric valve;
    said electric valve actuate the upon a signal, between two positions, a first of said positions being an open position allowing a flow of said water to said outflow component and a second of said positions being a closed position preventing said flow of water to said outflow component;
    a control, said control having an exterior contact surface adapted for a contact with a portion of the body of a user;
    said control having means to wirelessly communicate a said signal to said electric valve upon a said contact by said user with said contact surface;
    said means to wirelessly communicate having:
        an electrical power supply operatively connected to said control;
        a light transmission component configured to illuminate and transmit light exterior to said control as said signal, during a said contact with said contact surface; and
        a receiver for said light operatively engaged to said electric valve to thereby move said valve between said two positions each time a said signal is received;
    said control surface having a size sufficiently large to provide means for tactile locating of said control, without said user viewing said control; and
    whereby a said contact by said user with said contact surface will cause said electric valve if in said open position to move to said closed position and if in said closed position to move to said open position providing said user with closed eyes a means to locate and subsequently contact said contact surface with a body part such as a leg, hip or arm, to cease said water supply when not needed to save water.

2. The water flow control apparatus of claim 1 wherein said contact surface is one of an electric switch which is depressible by a said contact or an electronic switch which senses a said contact when touched by said user.

3. The water flow control apparatus of claim 2 wherein said contact surface is of a size between two square inches and thirty six square inches.

4. The water flow control apparatus of claim 1 wherein said contact surface is of a size between two square inches and thirty six square inches.

5. A water flow control apparatus comprising:
    an electric valve, said electric valve engageable between a pressurized water supply and an outflow component from a group of outflow components including a showerhead and faucet;
    means to electrically power said electric valve;
    said electric valve actuate the upon a signal, between two positions, a first of said positions being an open position allowing a flow of said water to said outflow component and a second of said positions being a closed position preventing said flow of water to said outflow component;
    a control, said control having an exterior contact surface adapted for a contact with a portion of the body of a user;
    said control having means to wirelessly communicate a said signal to said electric valve upon a said contact by said user with said contact surface;
    said means to wirelessly communicate having:
        a pump operatively engaged with said contact surface;
        a conduit running between said pump, and a pneumatic receiver operatively engaged with said electric control valve;
        said pump communicating air pressure through said conduit as said signal during a said contact with said contact surface; and
        said pneumatic receiver operatively communicating said signal to said electric control valve whereby said electric valve moves to the opposite position of said two positions each time a said signal is received;
    said control surface having a size sufficiently large to provide means for tactile locating of said control, without said user viewing said control; and
    whereby a said contact by said user with said contact surface will cause said electric valve if in said open position to move to said closed position and if in said closed position to move to said open position providing said user with closed eyes a means to locate and subsequently contact said contact surface with a body part such as a leg, hip or arm, to cease said water supply when not needed to save water.

6. The water flow control apparatus of claim 5 wherein said contact surface is one of an electric switch which is depressible by a said contact or an electronic switch which senses a said contact when touched by said user.

7. The water flow control apparatus of claim 6 wherein said contact surface is of a size between two square inches and thirty six square inches.

8. The water flow control apparatus of claim 5 wherein said contact surface is of a size between two square inches and thirty six square inches.

\* \* \* \* \*